United States Patent Office 3,579,591
Patented May 18, 1971

3,579,591
4,4′-BIS-(HYDROXYARLOXY)-PHENYLSULFONE
Hermann Schnell and Gerhard Darsow, Krefeld-Uerdingen, and Ludwig Bottenbruch, Krefeld-Bockum, Germany, assignors to Farbenfabriken Bayer Aktiengesellschaft, Leverkusen, Germany
No Drawing. Continuation-in-part of application Ser. No. 620,233, Mar. 3, 1967. This application Oct. 8, 1968, Ser. No. 765,993
Claims priority, application Germany, Mar. 18, 1966, F 53,836
Int. Cl. C07c 142/10, 51/00; C08a 22/14
U.S. Cl. 260—607  5 Claims

ABSTRACT OF THE DISCLOSURE

Aryl ethers of the formula

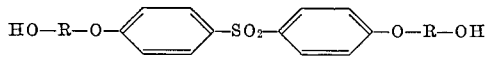

wherein R is a bivalent aromatic radical and the utility thereof as intermediates for reaction with carboxylic acid halides, dicarboxylic acid dihalides, isocyanates and polyisocyanates to produce, respectively, diesters, polyesters, diurethanes and polyurethanes. The aforesaid ethers are prepared by reacting 1 mol of 4,4′-dihalo-diphenylsulphone with about 2 mols diphenolate at a temperature between about 100 and 160° C. and acidifying resulting product.

---

This application is a continuation-in-part of application Ser. No. 620,233 filed Mar. 3, 1967 and now abandoned.

It is known from the Dutch patent application published under No. 6,408,130 to prepare high-molecular linear thermoplastic polyarylene polyethers by reacting molar amounts of, inter alia, dihalo-diphenylsulphones with dialkali metal phenolates in the presence of strongly polar inert organic solvents at temperatures between about 100 and 160° C.

The object of the present invention comprises a process for the production of novel aryl ethers by reacting dihalo-diphenylsulphones with dialkali metal phenolates in the presence of strongly polar inert organic solvents at temperatures between about 100 and 160° C., preferably at 120 to 140° C., said process being characterized by reacting 1 mole 4,4′-dihalodiphenylsulphone with about 2 moles diphenolate and acidifying the product.

This process gives aryl ethers of the general formula

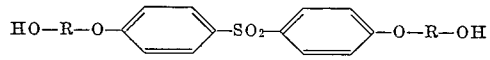

in which R denotes a mono- or polynuclear bivalent aromatic radical, in yields which are frequently about 90% of theory, and even more. This result is surprising, since it was to be expected on account of the bifunctionality of both reaction components that the reaction would lead to a broad spectrum of monomeric, oligomeric and polymeric ethers, and it is of particular value, because the obvious way of preparing the said diethers, i.e. to react 1 mole disulphone with 2 moles of the monosalt of diphenol, remarkably leads to substantially poorer yields.

Of the dihalo-diphenyl sulphones, the dichlorosulphone is primarily suitable, but the difluoro, dibromo and diiodo derivatives can also be used.

A great number of possible variations exist for selecting the bivalent phenols. The hydroxyl groups can be attached either to the same nucleus (e.g. hydroquinone, resorcinol) or to different nuclei (e.g. 4,4′-dihydroxydiphenyl, bis-(hydroxyphenyl)-alkanes, -ether, -sulphide, -sulphone etc.). They can stand in the ortho-, para- or meta-position to one another. In addition to the hydroxyl groups, the aromatic nucleus concerned can carry inert inorganic or organic substituents with the proviso that spacious substituents in a position adjacent to the hydroxyl groups do not fundamentally impair the reactivity of the latter by steric hinderance.

The corresponding alkyl phenolates are preferably prepared in situ by dissolving the phenol in a sufficient amount of the strongly polar solvent to be used for the subsequent reaction, adding the stoichiometric amount of alkali metal hydroxide, for example, sodium or potassium hydroxide, heating the mixture at about 120 to about 140° C. for some time, for example, 4–6 hours, and distilling off the water liberated by the phenolate formation. To achieve a rapid and complete removal of water, it is expedient to add a carrier, for example benzene or xylene, and to distil off the water from the mixture azeotropically with the additional solvent.

Examples of suitable polar inert organic solvents are diethyl sulphoxide, dimethyl-sulphone, diethyl-sulphone, diisopropyl-sulphone and tetramethyl-sulphone, but dimethyl-sulphoxide is preferably used.

To the solution of the phenolate in the strongly polar solvents there is added the stoichiometric amount of the dihalo-diphenylsulphone, expediently dissolved in the same solvent. The condensation is then carried out by heating this mixture at the stated reaction temperatures, for example, for 3–4 hours. The alkali metal halide thus formed is precipitated in the form of an insoluble salt and separated. After cooling the solution is mixed with acidified water whereby the terminal hydroxyl group of the ethers are liberated, the reaction product is precipitated in solid form and can be separated.

It is even more advantageous to perform the phenolate formation and the condensation simultaneously, instead of successively. For this purpose, stoichiometric amounts of phenol and dihalo-diphenylsulphone are dissolved in the strongly polar inert organic solvent, the stoichiometric amount of alkali metal hydroxide and the carrier are added and the mixture is slowly heated to the reaction temperature of 100–160° C., preferably 120–140° C. During this operation the water resulting from the phenolate formation is easily and rapidly distilled off azeotropically with the carrier.

In this case the reaction time only amounts to about 4–5 hours. The alkali metal halide formed in the simultaneous condensation is precipitated in the form of an insoluble salt and can be separated when the reaction is completed. After cooling, the solution is mixed with acidified water whereupon the reaction product is precipitated in solid form and can be separated. The yields thus obtained are as high as in the case where the formation of phenolate and the condensation are performed successively. The resultant crude product is of even higher quality as its coloration is slighter.

However, the ether formation also takes place in the presence of water and it is therefore not necessary to distill off the water from the reaction mixture before adding the dihalo-disulphone or continuously to remove the water from the reaction mixture in the presence of the dihalodisulphone.

One method of carrying out this performance consists in that stoichiometric amounts of phenol and alkali metal hydroxide are dissolved in the strongly polar inert organic solvent by heating the mixture in an inert gas atmosphere at about 100 to about 140° C., cooling the solution, adding the stoichiometric amount of dihalo-disulphone, and heating to the stated reaction temperature. The ether formation is completed in the course of about 2–8 hours. After cooling, the reaction solution is mixed with acidified water, whereupon the reaction product is precipitated in solid form and can be separated.

On the other hand, it is possible to allow the phenolate formation and the condensation reaction to proceed simultaneously by dissolving the stoichiometric amount of phenol and dihalo-diphenyl-sulphone in the strongly polar inert organic solvent, adding the stoichiometric amount of alkali metal hydroxide and slowly heating to the reaction temperature. With this method of carrying out the process, the total reaction time can be reduced, depending upon the reactivity of the phenolate, to about ½ hour to about 6 hours. After cooling, the reaction product is again mixed with acidified water whereupon the reaction product is precipitated in solid form and can be separated.

The new aryl ethers are to be used as intermediates for the production of synthetic materials, for example they may be reacted with carboxylic acid halides to the corresponding diesters, with dicarboxylic acid dihalides to the corresponding polyesters, with isocyanates to the corresponding diurethanes and with polyisocyanates to the corresponding polyurethanes.

EXAMPLE 1

Production of 4,4'-bis-[(4-hydroxy)-phenoxy]-phenylsulphone

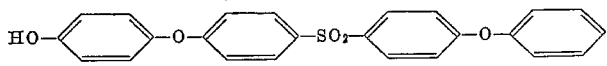

11.01 grams (0.1 mole) hydroquinone are placed in a glass flask of 250 ml. capacity and dissolved in 50 ml. dimethyl sulphoxide (DMSO). The glass flask is fitted with a gas feed tube, a stirrer, a thermometer, a reflux condenser and a water receiver filled with benzene, and a slow nitrogen current is passed through the apparatus in order to create an inert gas atmosphere. 11.22 grams (0.2 mole) potassium hydroxide in the form of tablets and 20 ml. benzene are added. The reaction mixture is then heated at a temperature of 140° C. for 4–5 hours, while the water resulting from the salt formation is continuously distilled off azeotropically with benzene. When the water is substantially removed from the mixture, the latter is allowed to cool. 14.36 grams (0.05 mole) 4,4'-dichloro-diphenylsulphone dissolved in 50 ml. dimethyl sulphoxide are then added. The mixture is heated with rapid stirring at 130–140° C. for 2–3 hours, whereby the potassium chloride formed in the reaction rapidly separates. After cooling, the mixture is slowly poured into 300 ml. of water which has been acidified with sulphuric acid and caused to move rapidly by means of a stirrer. The reaction product is thereby precipitated in solid form. It is filtered off with suction and then dissolved in a 5% aqueous sodium hydroxide solution in order to remove any unreacted 4,4'-dichloro-diphenylsulphone. The solution is filtered and subsequently poured with rapid stirring into 5% sulphuric acid, whereby the dihydroxyaryl ether is precipitated in the form of a white powder. The powder is washed with hot water in order to remove any unreacted hydroquinone. If the powder is coloured, it can easily be decoloured by means of active charcoal after being dissolved in ethanol or dioxan. Yield 93% of theory; percent by weight phenol.OH—Calc.n 7.85. Found 7.9. M.P. 187–188° C.

EXAMPLE 2

Production of 4,4'-bis[(3-hydroxy)-phenoxy]-phenylsulphone

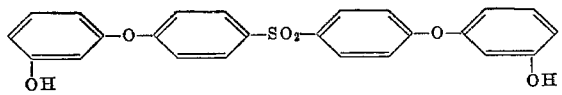

11.01 grams (0.1 mole) resorcinol dissolved in 50 ml. dimethyl sulphoxide are reacted in an apparatus according to Example 1 with 11.22 g. (0.2 mole) potassium hydroxide to form the dipotassium salt of resorcinol, while the resultant water is distilled off azeotropically with benzene (addition 20 ml.) by heating at 130° C. for 4 hours. To a solution of the salt in dimethyl sulphoxide there are added 14.36 g. (0.05 mole) 4,4'-dichloro-di-phenylsulphone. The reaction mixture is then heated at 140° C. for 4 hours. Working up of the reaction mixture is carried out as in Example 1. The dihydroxyaryl ether is obtained in the form of a white powder.

Yield 86% of theory; percent by weight phenol.OH—Calc. 7.85. Found 7.4. M.P. 86–87° C.

EXAMPLE 3

Production of 4,4'-bis-[4-(4-hydroxyphenyl-isopropyl)-phenoxy]-phenylsulphone

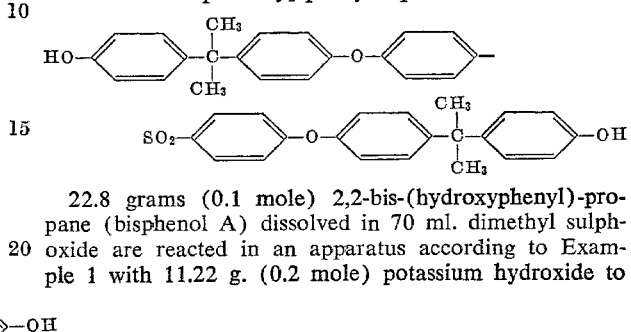

22.8 grams (0.1 mole) 2,2-bis-(hydroxyphenyl)-propane (bisphenol A) dissolved in 70 ml. dimethyl sulphoxide are reacted in an apparatus according to Example 1 with 11.22 g. (0.2 mole) potassium hydroxide to form the dipotassium salt of bisphenol A. For this purpose the mixture must be heated at 140° C. for about 4 hours. After cooling, the solution is admixed with 14.36 g. (0.05 mole) 4,4'-dichloro-diphenylsulphone and the mixture is heated at 130° C. for 4 hours. Working up is carried out as in Example 1. For the quantitative removal of unreacted bisphenol the product must be boiled several times with water. A snow-white powder is obtained.

Yield 92% of theory; percent by weight phenol.OH—Calc. 5.07. Found 4.9. M.P. 104–106° C.

EXAMPLE 4

Production of 4,4'-bis-[4-(4-hydroxyphenyl-sulphone)-phenoxy]-phenylsulphone

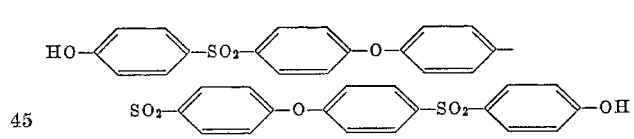

From 25.0 g. (0.1 mole) 4,4'-dihydroy-diphenyl-sulphone and 11.22 g. (0.2 mole) potassium hydroxide there is prepared the dipotassium salt of 4,4'-dihydroxy-diphenylsulphone and this is reacted with 14.36 g. (0.05 mole) 4,4'-dichloro-diphenyl-sulphone by heating at 140° C. for 6 hours. Working up is carried out as in Example 1. The product so obtained is a snow-white powder.

Yield 72% of theory; percent by weight phenol.OH.—Calc'd.: 4.75. Found: 4.75. M.P. 128–130° C.

EXAMPLE 5

Production of 4,4'-bis-[4-(4-hydroxy)-diphenoxy]-phenylsulphone

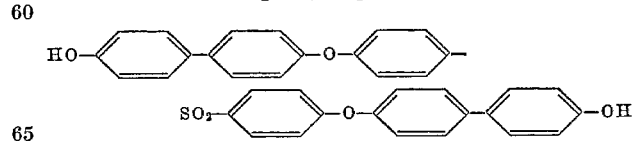

From 18.6 g. (0.1 mole) 4,4'-dihydroxy-diphenyl and 11.22 g. (0.2 mole) potassium hydroxide there is prepared the dipotassium salt of dihydroxy-diphenyl and this is reacted with 14.36 g. (0.05 mole) 4,4'-dichloro-diphenylsulphone by heating at 140° C. for 4 hours to form the bis-hydroxyaryl ether. The reaction product so obtained is a white powder.

Yield 90% of theory; percent by weight phenol.OH.—Calc'd.: 5.8. Found: 5.6. M.P. 211–215° C.

EXAMPLE 6

Production of 4,4'-bis-[(4-hydroxy)-phenoxy]-phenylsulphone

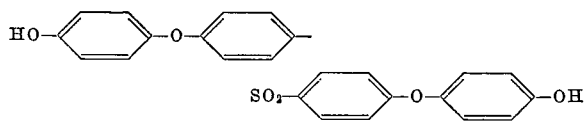

11.01 grams (0.1 mole) hydroquinone and 14.36 g. (0.05 mole) 4,4'-dichloro-diphenylsulphone are placed in a glass flask of 250 ml. capacity and dissolved in 100 ml. dimethyl sulphoxide (DMSO). The glass flask is fitted with a gas feed tube, a stirrer, a thermometer, a reflux condenser and a water receiver filled with toluene. A slow nitrogen current is then passed through the apparatus in order to create an inert gas atmosphere. 11.22 grams (0.2 mole) potassium hydroxide in the form of tablets and 30 ml. toluene are added. The reaction mixture is then heated at 140° C. for 4–5 hours, while the water resulting from the phenolate formation is continuously distilled off azeotropically with toluene. At the same time the potassium chloride formed in the condensation reaction is precipitated. When the water is completely removed from the mixture, the latter is allowed to cool. The reaction mixture is then slowly poured into 300 ml. of water which has been acidified with sulphuric acid and caused to move rapidly by means of a stirrer. The crude product which is precipitated in solid form is filtered off with suction and dissolved in a 5% aqueous sodium hydroxide solution. The solution is filtered and subsequently poured with rapid stirring into 5% sulphuric acid, whereupon the dihydroxy-aryl ether is precipitated in the form of a white powder. If the product is coloured, it can easily be decoloured by means of active charcoal, after being dissolved in alcohol or dioxan.

Yield 89% of theory; percent by weight phenol.OH.—Calc'd.: 7.85. Found: 7.9. M.P. 191.5–193° C.

EXAMPLE 7

Production of 4,4'-bis-[4-(4-hydroxy) diphenoxy]-phenylsulphone

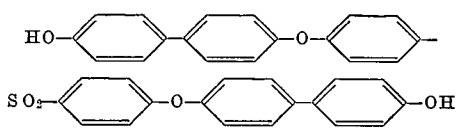

18.6 grams (0.1 mole) 4,4'-dihydroxy-diphenyl-sulphone and 14.36 g. (0.05 mole) dichloro-diphenylsulphone dissolved in 150 ml. dimethylsulphoxide are heated in an apparatus according to Example 6 with 11.22 g. (0.2 mole) potassium hydroxide and 50 ml. toluene at 140° C. for 4 hours, while the water resulting from the phenolate formation is continuously distilled off azeotropically with toluene. Working up of the reaction mixture is carried out as in Example 6. The dihydroxylaryl ether is obtained in the form of a white powder.

Yield 87% of theory; percent by weight phenol.OH.—Calc'd.: 5.8. Found: 5.7. M.P. 211–213° C.

EXAMPLE 8

Production of 4,4'-bis-[4-(4-hydroxyphenyl-isopropyl)-phenoxy]-phenyl-sulphone

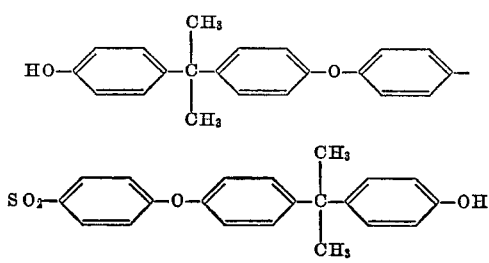

114.1 g. (0.5 mole) 2,2-bis-(hydroxyphenyl)-propane (bisphenol A) and 40 g. (1 mole) sodium hydroxide in the form of tablets are dissolved in 600 ml. dimethyl sulphoxide with stirring and heating at 100–120° C. in a nitrogen atmosphere. The solution is allowed to cool to 50–60° C., and 71.8 g. (0.25 mole) 4,4'-dichloro-diphenylsulphone are added. The mixture is then heated at 120–140° C. with further stirring, whereupon sodium chloride which is insoluble in dimethyl sulphoxide is rapidly precipitated; the reaction mixture is then allowed to cool and slowly poured into 5 ml. of water which has been acidified with sulphuric acid and is put into rapid motion by means of a stirrer. The reaction product is thus precipitated in the form of a fine white powder. It is filtered off with suction, washed with water until the reaction is neutral, and dried. The bis-hydroxy-aryl ether obtained dissolves easily and completely in a dilute sodium hydroxide solution. It can therefore be purified by reprecipitation from a sodium hydroxide solution or by recrystallisation from ethyl acetate, benzene or petroleum ether.

Yield 153 g. (91% of theory); percent by weight: phenol.OH.—Calculated 5.07. Found: 5.1. Melting point 104–106° C.

EXAMPLE 9

Production of 4,4'-bis-[(4-hydroxy)-phenoxy]-phenylsulphone

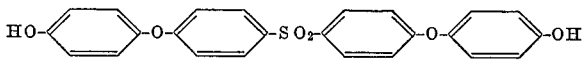

11.01 g. (0.1 mole) hydroquinone and 14.36 g. (0.05 mole) 4,4'-dichloro-diphenyl-sulphone are dissolved in 150 ml. dimethyl sulphoxide with stirring and in a nitrogen atmosphere. 12.9 g. (0.2 mole) potassium hydroxide in the form of tablets (87.4%) are then added and the reaction mixture is slowly heated to 120–140° C. The condensation reaction is completed after 2–4 hours. Working up of the reaction mixture is carried out as in Example 1. To remove any unreacted hydroquinone, the bis-hydroxy-aryl ether is washed with hot water. If the powder is coloured, it can easily be decolourized with active charcoal after being dissolved in methanol or dioxan. A fine crystalline powder is obtained after precipitation with water.

Yield 20 g. (92% of theory); percent by weight: phenol.OH.—calculated 7.85. Found: 7.9. Melting point 191.5–193° C.

We claim:
1. An aryl ether of the formula

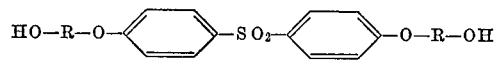

wherein R is phenylene, biphenylene, bis-(phenylene) alkane, bis-(phenylene)-ether, bis-(phenylene)-sulfide or bis-(phenylene)-sulphone.

2. 4,4'-bis-[(4-hydroxy)-phenoxy]-phenylsulphone.
3. 4,4'-bis[4-(4-hydroxy)-diphenoxy]-phenylsulphone.
4. 4,4'-bis-[4-(4-hydroxylphenyl-isopropyl)-phenoxy]-phenylsulphone.
5. 4,4'-bis-[4-(4-hydroxylphenyl-sulphone)-phenoxy]-phenylsulphone.

References Cited

UNITED STATES PATENTS 3,032,594   5/1962   Towle _____ 260—612
3,355,272   11/1967  D'Alessandro _____ 260—837X

FOREIGN PATENTS 650,476   1/1965   Belgium _____ 260—607

CHARLES B. PARKER, Primary Examiner

D. R. PHILLIPS, Assistant Examiner

U.S. Cl. X.R.

260—77.5, 468, 553, 609, 621